United States Patent
Bryant et al.

(10) Patent No.: US 7,413,666 B2
(45) Date of Patent: Aug. 19, 2008

(54) METHOD FOR SELECTIVELY SAMPLING PARTICULATES IN BOILER/STEAM CYCLE CORROSION TRANSPORT

(76) Inventors: Robert L. Bryant, 6991 Peachtree Industrial Blvd., Norcross, GA (US) 30092; John W Clark, Bldg. 600, Peachtree Industrial Blvd., Norcross, GA (US) 30092

( * ) Notice: Subject to any disclaimer, the term of this patent is extended or adjusted under 35 U.S.C. 154(b) by 176 days.

(21) Appl. No.: 11/522,609

(22) Filed: Sep. 18, 2006

(65) Prior Publication Data

US 2008/0067133 A1 Mar. 20, 2008

(51) Int. Cl.
*G01N 21/85* (2006.01)

(52) U.S. Cl. .................. 210/745; 210/748; 210/767; 210/790; 73/1.02; 73/64.56; 73/863.23; 73/863.41

(58) Field of Classification Search ............... 73/1.02, 73/433, 28.04, 28.01, 30.01, 31.07, 434, 73/64.56, 114.55, 114.68, 861.04, 863.01, 73/863.21, 863.41, 863.23, 61.71, 61.72; 250/343, 573, 577; 210/745, 96.1, 92, 96.2, 210/94, 93, 95, 748, 767, 739, 790, 805; 356/436, 441, 442, 335

See application file for complete search history.

(56) References Cited

U.S. PATENT DOCUMENTS 5,578,995 A * 11/1996 Bryant et al. ................ 250/574
5,798,699 A * 8/1998 Bryant et al. ............ 250/338.1

* cited by examiner

*Primary Examiner*—Matthew O. Savage
*Assistant Examiner*—Lucas Stelling
(74) *Attorney, Agent, or Firm*—Harry I. Leon; Vivian L. Steadman

(57) ABSTRACT

An improved method for isolating the impacts of flow-altering events in corrosion transport from those due to steady state corrosion in boiler/steam cycle processes. The method includes monitoring, in real time, with a particle counter or particle monitor levels of suspended particles in a fluid flow stream and of automatically collecting insoluble particulates large enough to be captured on a 0.45 micron filter when, and only when, these levels exceed an "event threshold". For use in subsequently characterizing flow-altering events without necessarily weighing the collected particulates for each excursion above this threshold, an average particle count/ particle index is obtained and compared with the actual weight of insoluble particulates captured. When excursions are highly infrequent, concentrations of insoluble metal oxides likely to be present in the flow stream and capable of producing above-threshold PC/PIs can be determined and used to identify anomalies when particulates are captured.

3 Claims, 4 Drawing Sheets

METHOD FOR SELECTIVELY SAMPLING PARTICULATES IN BOILER/STEAM CYCLE CORROSION TRANSPORT

BACKGROUND OF THE INVENTION

This invention relates to monitoring particulate matter in fluid flow streams circulated in boiler/steam cycle process equipment.

A long-standing challenge for those engaged in power production is that of minimizing metal corrosion and transport in boiler/steam cycle processes. As is well known, water is extremely corrosive at high temperatures and oxidizes the walls of boilers, heat exchangers and associated piping as it circulates through them, forming soluble and suspended oxides of iron and copper. Importantly, a small buildup of these metal oxides can reduce the heat transfer rates sufficiently in a boiler/steam system to cause a catastrophic failure.

While the potential for corrosion transport related to upsets in system chemistry in boiler/steam cycle process equipment is widely understood, many basic questions remain. Some investigators have even suggested that velocity changes—which affect primarily the distribution of insoluble particulates—may play a more important role in the boiler cycle than does a steady corrosion rate. Questions have also been raised as to what extent conventional chemical measurements, i.e., conductivity, pH, dissolved oxygen, and specific ion measurements, indicate the level of metal transport in a system and whether anti-corrosion additives interact at all with insoluble contaminants. Uncertainties abound in part because previous monitoring efforts did not provide for correlating particulate iron and copper concentrations with an exact time of transport.

Moreover, only recently, after years of testing at various power plants, has the magnitude of the component contributed by insoluble particulates to corrosion transport become apparent. Using corrosion transport sampling equipment augmented by ion-exchange technology, investigators have now deduced that typically between 90 and 95 percent of the specii involved in metal transport phenomena are particulates large enough to be captured on a 0.45 micron filter. Obscuring this finding earlier was the fact that significant variations in the relative percentages of soluble and suspended metal oxides exist between individual power plants. Furthermore, these relative percentages vary with:

Sample stream and location sampled.
Oxidation/reduction environment at a particular sampling location.
Temperature, flow rate and system design.
System chemistry.

Substantially larger than the specii present at the onset of particulate formation, the insoluble particles measured with this augmented corrosion transport sampling equipment were, for each sample stream tested, first removed from it with the use of a 0.45 micron filter pad; and then the sample stream was directed through a series of ion-exchange resins, located downstream of the filter pad. The ion-exchange resins were used to selectively adsorb soluble species such as iron and copper ions. After the sample stream had been pushed through the pad and resins for a relatively long preset time interval (typically 24 hours), both the pad and resins were removed and separately dissolved, digested in acid and then ultimately subjected to a sophisticated and time-consuming atomic absorption spectroscopy-based metals analysis, so that their respective metal contents could be measured.

Unfortunately, flow-altering events—which typically occur during startup, shutdown and other non-steady state conditions—tend to occur over much shorter time intervals than a full 24-hour period. As a consequence, the impact of such events cannot be readily isolated from prior art data based primarily on 24-hour "composite" samples and the like.

For testing system particulate iron under non-steady state conditions, little has changed until now since boiler manufacturers Babcock and Wilcox introduced, many years ago, comparison charts which enabled users, who first captured particulate iron from one liter samples on filters, to estimate the type of iron oxide and the approximate concentration of particulate iron present based upon the appearance (color and intensity or darkness of color) of the material captured on the filter. This method, still used today during power plant startups, provides a quick, but nonetheless fairly accurate, test of system particulate iron. One of the drawbacks of this filter method is that low level trace metal analysis determinations are not possible.

Promising alternate approaches have involved using automated samplers to collect discrete ("grab") samples from a fluid flow stream either at periodic intervals or only whenever major excursions or "spikes" in the levels of contaminants in a flow stream are detected. The former approach has proven itself to be largely impractical, except possibly in the case of peaking/cycling boiler/steam systems. Recent extended monitoring of boiler/steam units having minimal starts during a year, for example, indicates that few, if any, distinct and significant flow-altering events occur in them for weeks at a time. Collecting samples only during major excursions, on the other hand, requires the use of an instrument for detecting particulates, such as the particle monitor employed in the automated sampler combination disclosed by Bryant and Veal in U.S. Pat. No. 5,798,699, or a particle counter.

Distinctly different from the particle monitor, the particle counter, which is based on the optical method of light blocking or "extinction", can detect 2 micron or larger particles in fluids and size them, putting them into "bins" of defined size ranges; the particle monitor, by contrast, can at most track trends in particulate concentrations—specifically, concentrations in aggregate of particles of the order of 1 micron or larger in size. Nevertheless, now that 0.45 micron and larger suspended particles are known to dominate metal transport to such a high degree, the particle monitor has gained wider acceptance as the instrument of choice for detecting particulates. Formerly, that position, as is well known, was held by the turbidimeter, an instrument which, unlike either the particle monitor or the particle counter, can, under favorable conditions, detect the onset of particulate formation.

Whether the particle monitor or the particle counter is used for detecting particulates, major obstacles remain for those seeking to isolate the impact of flow-altering events on corrosion transport. Both of these alternate approaches depend upon collecting individual discrete samples which tend to age quickly. And as they age, information is readily lost regarding the relative percentages of soluble and insoluble contaminants which may be present in the flow stream. Further, analyses of metal oxide transport phenomena are complicated by the fact that the quantity of particles of a given size range detected by the particle counter is dependent upon, among other things, the composition of the particles and the mixture of which they are a part. Specifically, recent testing by the applicants has shown that the particle count may be substantially lower than what would be expected on the basis of the mass of metal oxides captured on a 0.45 micron filter.

SUMMARY OF THE INVENTION

The object of the present invention is to provide an improved method and apparatus for automatically collecting insoluble particulates present in discrete samples during excursions or "spikes" in the levels of suspended contaminants in a fluid flow stream without having to collect insoluble particulates either when these levels are not elevated or after the samples have aged, so that the component of corrosion transport attributable to flow-altering events can be isolated from that which occurs generally as a result of steady state corrosion.

A further object of the present invention is to provide an improved method for correlating the particle counts/particle indices which a particle counter/particle monitor records during individual excursions or "spikes" in the levels of insoluble contaminants in the fluid flow stream in a particular boiler/steam system with the mass of insoluble particulates present in a measured volume of the fluid taken from the flow stream during such an excursion, but only for those particulates which are large enough to be captured on a 0.45 micron filter pad, so that a user can identify and characterize flow-altering events, however infrequent they may be, without necessarily collecting insoluble particulates during each such excursion or "spike".

In accordance with the present invention, there is provided an improved method which includes the steps of automatically diverting, from its normal course, a portion of a fluid flow stream into a sample container and simultaneously passing a like-sized volume of the flow stream through a 0.45 micron filter, but only when the particle index or, alternately, particle count of the fluid has risen to a preset level or threshold and maintained this level for an interval of time corresponding to a predetermined "event delay" value.

Also included in the improved method when it is to be used for correlating the particle counts/particle indices with said mass of insoluble particulates are the following steps: measuring the actual particulate weight captured from the like-sized volume of the flow stream during an individual excursion; obtaining an average particle count/particle index for the excursion; selecting a "first iteration" ratio of concentrations of insoluble metal oxides likely to be present in the flow stream which, as determined empirically, can produce said average particle count/particle index; and identifying anomalies in which the actual particulate so captured is significantly different from that predicted on the basis of the "first iteration" ratio and the average particle count for the excursion itself.

DETAILED DESCRIPTION OF THE INVENTION

Figure 1:
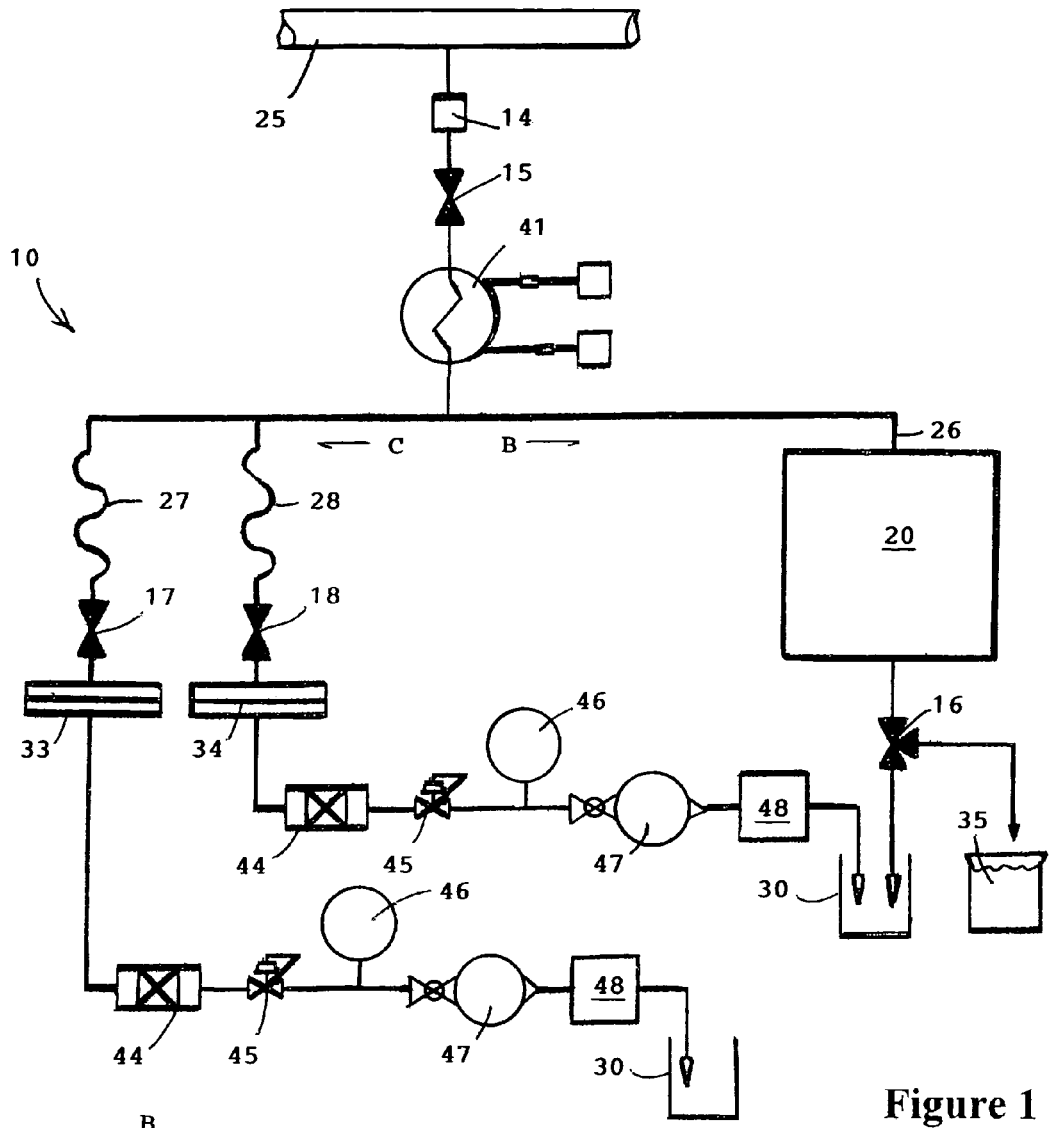
FIG. 1 is a schematic of components within an apparatus for practising the method according to the present invention.

Referring to the drawings, an apparatus, denoted generally by the reference numeral 10, comprises solenoid valves 16, 17 and 18, a particle counter 20 equipped with a sensor which is located upstream of the 3-way solenoid valve 16, and a controller for electronically actuating the valves. Situated downstream of valves 17 and 18 are filters 33 and 34, respectively, each of which houses a filter pad capable of removing 0.45 micron and larger particulates from a sample of a process flow stream such as those which are typically found in boiler/steam systems. Fluidly connected in parallel to a common sample port 14 are supply lines which simultaneously, when valve 15 is open, either feed small fluid flow streams B and C into the particle counter 20 and normally open valve 17, or into the particle counter and normally closed valve 18.

Figure 2:
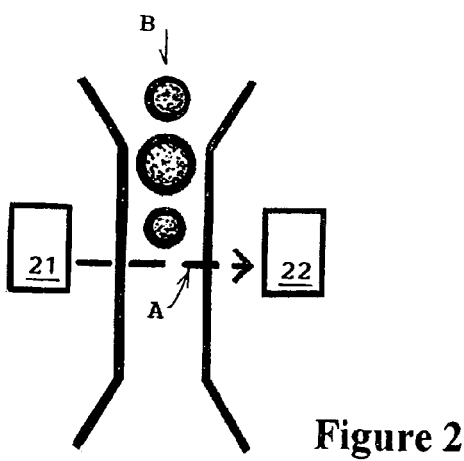
FIG. 2 is a schematic of components within the apparatus according to FIG. 1, when it is equipped with a particle counter, the components including both a laser diode and a detector, the diode generating a laser beam which is partially obscured by particulates in a fluid flow stream as they traverse the laser beam.

In use, stream B courses continuously, and at a constant flow rate which measures, by way of example, at most 500 ml per minute and preferably between 100 and 500 ml per minute, through tubing 26 and into the particle counter 20 where particulates in the flow stream B are intersected by a laser beam A generated by a laser diode 21 (FIG. 2).

As the particulates are so intersected, they create shadows on a detector 22. The latter converts the shadows to electrical pulses, measured in millivolts and proportional in magnitude to individual particle sizes. A high speed microprocessor interprets the data embedded in the pulses and directs information obtained from the data into "bins" of selected size ranges, e.g., 2-5 microns, 5-10 microns, and so on. Since stream B flows continuously and at a constant rate, the data can be expressed in terms of particles per milliliter, or "counts per ml" for each size bin. Particle sizes are expressed in diameters; and the assumption is made that size "distribution" would be the same whether all particles were spherical or circular. In many practical applications, the fact that the particles are neither spherical nor circular does not detract from the usefulness of the data. The particle counter 20, like other on-line particle counters currently being used to monitor potable and industrial waters, is capable of detecting one (1) particle per milliliter of 2 micron size, which is the equivalent of 0.4 parts per trillion on a volumetric basis.

A particle counter which has been found satisfactory for this application is the Chemtrac Model PC 2400D, available commercially from Chemtrac Systems, Inc. of Norcross, Ga. General specifications for this model are as indicated below:

| | |
|---|---|
| Light Source | Solid-state Laser Diode |
| Detection Method | Light extinction, volumetric |
| Light Detection | Photo diode (780 nm, 3 mV) |
| Flow cell | 1 mm × 1 mm |
| Cell Material | Nituff ® coated aluminum |
| Cell Window | Sapphire |
| Cell max operating pressure | 120 psi (8.27 bar) |
| Operating Water Temp. | 32-122 deg. F., Relative Humidity 20 to 85%, non-condensing |
| Flow rate | 40-110 ml/min. |
| Dynamic Range | 2-900 microns |

-continued

| | |
|---|---|
| Signal to Noise Ratio | >3:1 at 2 microns |
| Coincidence | <10% at 15,000 particles/ml at 10 microns |
| Sample Head | 20" (508 mm) water min. |
| Inputs | Accepts up to 4 analog (4-20 mA) signals from other analyzers |
| Outputs | Four 4-20 mA, assigned to first four size channels |
| Communications | Modbus RTU/ASCII, Profibus-DP, Modbus TCP, Web Server Capabilities, OPC Server, DDE Server and proprietary TracWare Software |

Upon receiving the pulsed output from the detector 22, the microprocessor not only categorizes the data according to selected size ranges but also computes a total particle count per unit volume. The latter is then compared with an "event threshold" set at an arbitrary value, which is generally at least 10 times greater than the "normal" particle count for a given flow stream. For instance, if the "normal" particle count is 20, the threshold might be set at 200. The "event threshold" corresponds to the minimum particle count which the particle counter 20 must measure in the flow stream B before the controller initiates a sequence of events which may result in a sample being collected in container 35 and simultaneous capture of particulate on the 0.45 micron filter pad 34.

In the preferred embodiment, the controller includes a microprocessor with a programmable timer, such as controller model Z-104 available commercially from Z-World Engineering in Davis, Calif. Upon receiving a signal from the microprocessor that the particle count exceeds the "event threshold", the programmable timer initially blocks transmission of an electronic signal which would otherwise be sent from the controller to the 3-way solenoid valve 16 until the "event threshold" has been exceeded for a preset time interval known as the "event delay". User defined, the "event delay" value can be a few seconds or several minutes. Normally, this value is several minutes since a "spike" of only a few seconds duration may be caused by an inconsequential event. Provided the "event threshold" is still met when the "event delay" time has expired, the controller actuates the valve 16, causing its normally open portal to close and its normally closed portal to open. As a result, the sample flow stream B is diverted from drain 30 to sample container 35. Measuring, by way of example, 100 ml in volume, the container 35 is preferably rinsed at least 3 times before a sample is actually collected.

Simultaneously with the opening of the normally closed portal of the valve 16, the controller signals normally open valve 17 to close and normally closed valve 18 to open, diverting the sample flow stream C from filter pad 33 to filter pad 34. Fluidly connected to the filter pad 34 and situated downstream thereof is a flow totalizer 48 for recording the total volume of stream C which actually flows through the pad. Available commercially from Sentry Equipment Corp. of Oconomowoc, Wis., as part of a single sample module Model CPS-11 for use with corrosion transport sampling equipment, are both the filter pad 34 and the flow totalizer 48. Preferably, an ion exchange column 44, pressure reduction valve 45, pressure gauge 46, and flow indicator with control valve 47—all components of the module as well—are interposed between the filter pad 34 and the totalizer 48 and fluidly connected to both of them.

As is also illustrated in FIG. 1, the particle counter 20 is fluidly connected to a heat exchanger 41 and indirectly to a process pipe 25. Preferably, the flow rate through tubing 27, 28 is in the range of 2 to 330 milliliters per minute, whereas that through tubing 26 is as high as 500 milliliters per minute.

In use, a software program is used to compute an average particle count, as well as an approximate metal oxide mass transported for each event sampled. Provided the particle count measured by the counter 20 during an excursion continues to be at least as great as the "event threshold" throughout the "event delay" interval, the software program then proceeds to integrate the total particle counts measured for each of the subintervals of an excursion up to a point in time when the rate of increase of the particle count begins to fall and thereafter generally continues to fall to a particle count which is less than the "event threshold". The subintervals are user defined but preferably are of the order of 1 minute or less in length for typical excursions, one of which lasting about 3 hours is illustrated by an excursion graph in FIG. 2. The "average particle count" is computed by dividing the integrated total particle counts by the number of subintervals in a given excursion.

Generally, the user decides, on the basis of past experience with the boiler cycle waters he is monitoring, what portion of the particle counts which lie at or above the "event threshold"—indicated by the dashed line ET in FIG. 3, for example—is included in the integration of the total particle counts as outlined hereinabove. In the case of the excursion graph shown in FIG. 3, the total particle counts so integrated lie on the upper boundary of the lightly cross-hatched bar and only occur before or proximate with the maximum in the excursion graph. In other situations, as much as all of that portion of the total particle counts which lie at or above the "event threshold" may be included in the integration of the total particle counts. Other lines in FIG. 3 record particle counts (PC), drum pressure (DP), cation conductivity (CC), boiler conductivity (BC), dissolved oxygen (DO), and unit load (UL)—all parameters which, with the exception of the particle counts—were measured with sensors not shown in FIG. 1.

Simultaneously with a determination by the software program that the particle counts, as shown on the excursion graph, have at least "peaked", and possibly fallen as far downwardly as the "event threshold", the controller signals: the normally closed valve 18 to close, diverting the sample flow stream C from filter pad 34 to filter pad 33. At the same time, the 3-way solenoid valve 16 is deactivated, causing its normally closed portal to close and its normally open portal to open so that the sample flow stream B is once again diverted to the drain 30. The user then removes the filter pad 34, which is preferably a Millipore® filter or equivalent prepared as specified in the *Standard Methods for the Examination of Water and Wastewater* (published by the APHA, AWWA, and WPCF, 17th edition, 1989), and dries and weighs the pad analytically to determine the actual mass of particulates captured thereon during the excursion. Alternately, the filter pad 34 is prepared for atomic absorption (AA) analyses in accordance with standard methods. Further, in situations in which sufficient data has been obtained from the same sample port 14 from past excursions to generate a correlation index between the "average particle count" and the mass of insoluble particulates captured on the pad 34, the user can compute an approximate metal oxide "mass transport" for this most recent excursion and compare this value with the actual particulate mass captured, so that possible anomalies in excursions can be identified.

Because significant excursions are infrequent in some boiler/steam systems, an alternate approach to generating a correlation index—one based on "spiking" samples of a particular boiler cycle process flow stream—is also provided.

Figure 3:
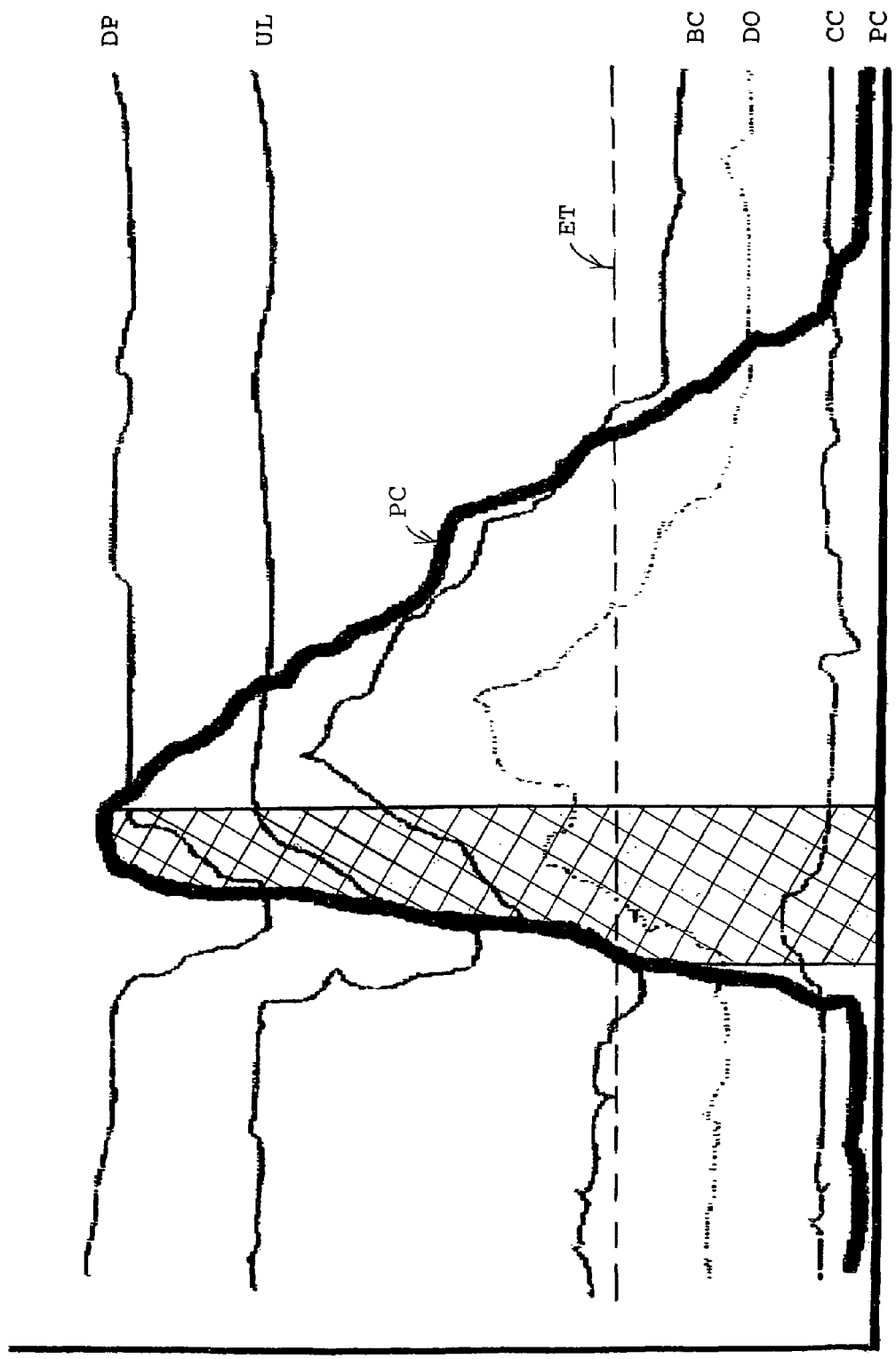
FIG. 3 is a plot of the output of the sensor in an apparatus according to FIG. 1, when it is equipped with a particle counter, the plot showing, in bold line, variations in the particle count with time as have been measured in a process flow stream, variations in conventional chemical parameters for the same flow stream which were measured with sensors not shown in FIG. 1 being presented in less bold lines and forming no part of the invention.
Figure 4:
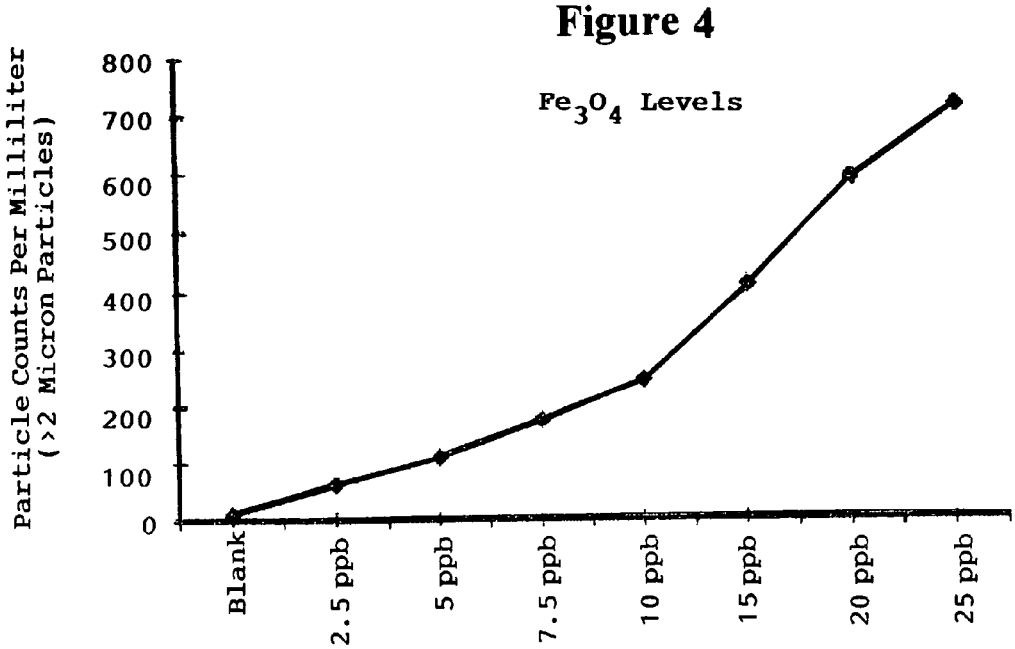
FIGS. 4, 5 and 6 are plots of the output of the sensor in an apparatus according to FIG. 1, when it is equipped with a particle counter, the plots showing variations in the particle count for a sample flow stream into which have been injected known concentrations of magnetite, hematite, and cupric oxide, respectively—the three compounds which constitute over 99 percent of the insoluble metal oxides known to be present in boiler cycle waters.
Figure 5:
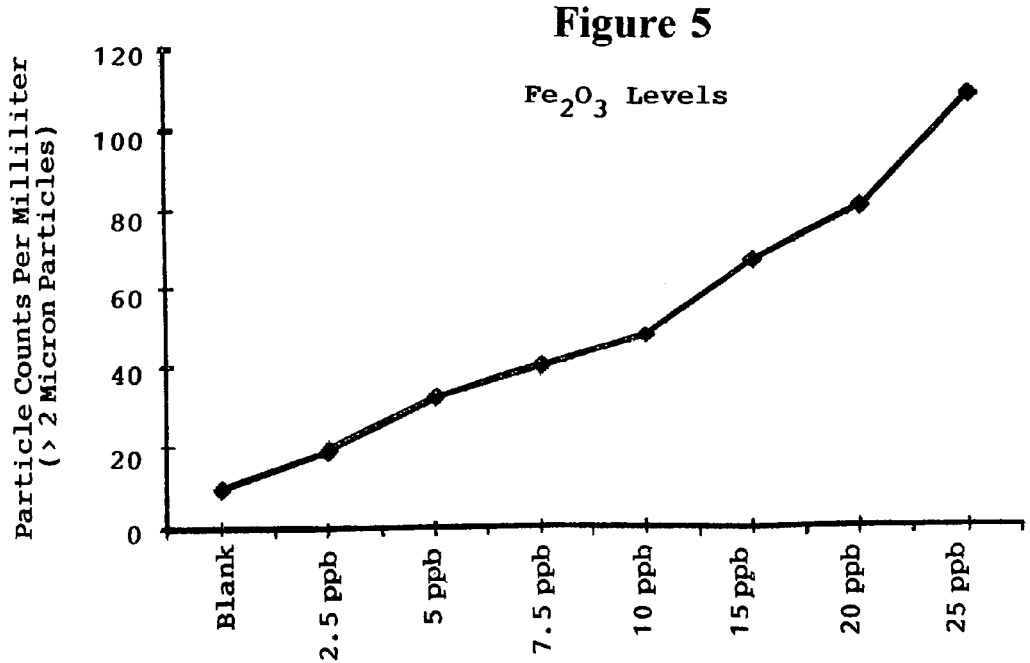
Figure 6:
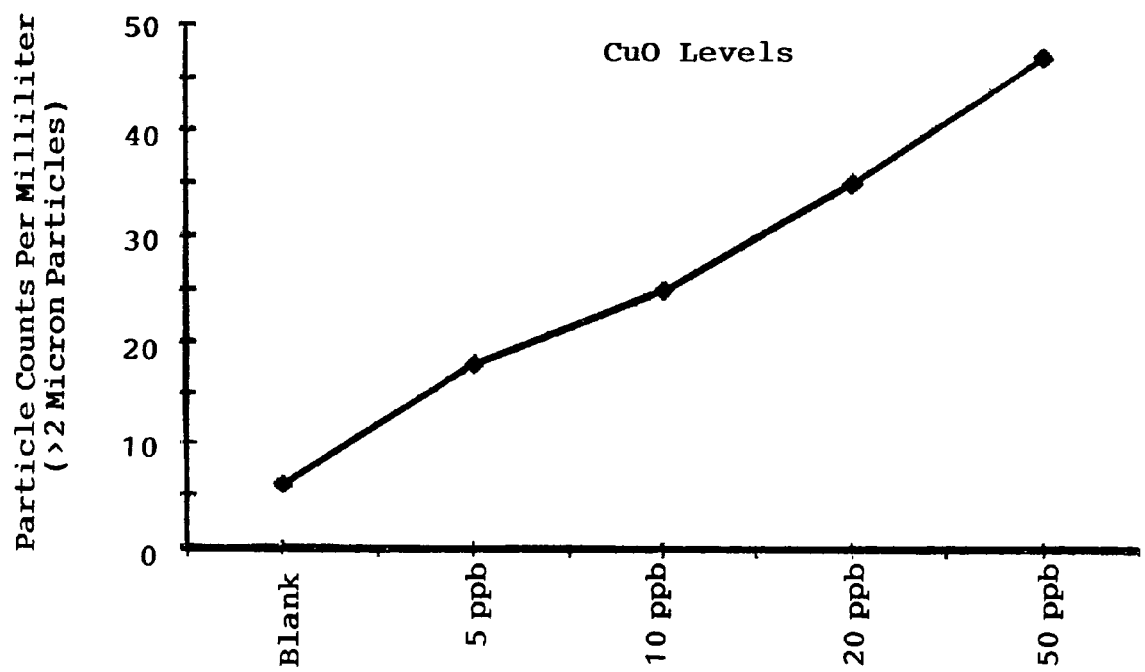

Graphs such as those presented in FIGS. 3, 4 and 5 which show particle counts as a function of the concentration of commercially available compounds of magnetite, hematite, and cupric oxide, respectively—all insoluble metal oxides known to be present in boiler cycle waters—can be empirically derived using standard techniques. Importantly, the response of the particle counter 20, as illustrated in FIGS. 3 and 4, is much more pronounced in the case of magnetite than for hematite—a difference which profoundly affects the integrated total particle counts during excursions for sample flow streams having mixtures of magnetite and hematite. Moreover, the ratio between the concentrations hematite. Moreover, the ratio between the concentrations of magnetite and hematite in boiler cycle waters is known to shift substantially with, among other things, changes in anti-corrosion additives.

In preparing the alternate correlation index, the particle counter 20 is used to size and count various concentrations of the commercially available metal oxide compounds, including mixtures in which they are present in different ratios in samples—preferably, samples which not only are taken during a non-excursion from a sample port 14 but also contain magnetite, hematite, cupric oxide and other insoluble metal oxides in the relative concentrations at which they are likely to coexist in boiler cycle waters of interest.

As a first approximation, the ratio between the concentrations of magnetite, hematite and cupric oxide in such samples can be assumed to be same as that captured on the filter pad 33, which is preferably used to filter the flow stream B, except during excursions, for 24-hour periods or longer. For its first iteration, the alternate correlation index can then be developed from the response of the particle counter 20 as the concentrations of these three insoluble metal oxides are raised, while maintaining said ratio, so as to yield particle counts which exceed the "normal" particle count for the flow stream B by a factor of 10 or more, that is, lie at or above the usual "event threshold". A significant difference between the actual particulate mass captured on the filter pad 34 and that predicted on the basis of the integrated total-particle counts and the alternate correlation index may indicate a shift in the ratio between the concentrations of the insoluble metal oxides which an operator can use to identify procedures which best mitigate metal oxide transport in a particular boiler/steam system.

In an alternate embodiment of the apparatus 10, the particle counter 20 is replaced by a particle monitor such as the Model PM 3500, available commercially from Chemtrac Systems, Inc. of Norcross, Ga. General specifications for this model can be found in U.S. Pat. No. 5,798,699. Like the particle counter 20, the particle monitor can be used to monitor the level of particulate matter in a sample flow stream and automatically collect both a liquid and a particulate sample from such a stream during, but only during, each excursion or "spike" in which this level exceeds, for an "event delay" interval, a preset "event threshold".

Sensitive to particles of the order of 1 micron in size or larger, whereas the particle counter can only detect particles at least 2 microns in size, the particle monitor can be used to generate yet another alternate correlation index. The latter alternate correlation index represents more accurately the presence of hematite particles, many more of which are known to exist in certain boiler cycle waters at sizes smaller than 2 microns than is the case for magnetite particles.

In the preferred embodiment, the heat exchanger 41, which is located downstream of the sample port 14 (FIG. 1), is used to lower the temperature of the sample flow stream B to 120 degrees Fahrenheit or less, whenever a particle monitor is used in the apparatus 10 instead of the particle counter 20.

What is claimed is:

1. A method of collecting insoluble particles present in a fluid flow stream, particulate matter being collected only when concentrations of the insoluble particles exceed a predetermined threshold level, comprising:
   (a) continuously counting, on-line and on the basis of preset size ranges, individual particles in a first portion of the flow stream which traverse a laser beam and cast shadows on a detector when the shadows cast are at least as large as that cast by an opaque particle approximately 2 microns in diameter, numbers of particles so counted for a preset subinterval of time and size range being known as particle counts;
   (b) simultaneously diverting a second portion of the fluid flow stream from its normal course and passing the second portion through a 0.45 micron filter when the total particle count, in a given subinterval, of the particles in the first portion of the flow stream has risen to the threshold level and maintained this level for an interval of time corresponding to a predetermined event delay value;
   (c) returning the second portion of the fluid flow stream to its normal course while the total particle count remains above the threshold level, the second portion being so returned only after the particle count reaches a maximum for each excursion above the threshold level in which the second portion is diverted; and
   (d) computing an average particle count for each such excursion by adding together, for each subinterval of time, the particle counts for particles of all sizes greater than 2 microns so as to obtain a total particle count for the subinterval, integrating the total particle counts for all of the subintervals of the excursion, and dividing the integrated total particle counts by the number of subintervals in the excursion.

2. The method according to claim 1, which further comprises:
   (a) weighing particulate matter collected on the 0.45 micron filter using standard analytical procedures;
   (b) comparing the weight of particulate matter so collected with the integrated total particle counts measured for the excursion up to the subinterval in which the second portion of the fluid flow stream was returned to its normal course;
   (c) generating a correlation index in which the average particle count for each such excursion is compared with the weight of particulate matter collected on the filter after said weight has been averaged over the subintervals of the excursion.

3. The method according to claim 1, which further comprises:
   (a) preparing the 0.45 micron filter on which particulated matter has been collected for atomic absorption (AA) analyses in accordance with standard methods, the AA analyses including differentiation of metal specii; and
   (b) generating a correlation index in which the average particle count for each such excursion is compared with concentrations of metal specii so differentiated.

* * * * *